(12) United States Patent
Friedman et al.

(10) Patent No.: US 11,603,235 B2
(45) Date of Patent: Mar. 14, 2023

(54) INFLATABLE BUCKET LID SEAT AND HARNESS

(71) Applicants: Matthew J. Friedman, Scottsdale, AZ (US); Michael L. Bill, Dana Point, CA (US)

(72) Inventors: Matthew J. Friedman, Scottsdale, AZ (US); Michael L. Bill, Dana Point, CA (US)

( * ) Notice: Subject to any disclaimer, the term of this patent is extended or adjusted under 35 U.S.C. 154(b) by 336 days.

(21) Appl. No.: 16/909,516

(22) Filed: Jun. 23, 2020

(65) Prior Publication Data

US 2021/0394972 A1     Dec. 23, 2021

(51) Int. Cl.
| | |
|---|---|
| B65D 43/02 | (2006.01) |
| B65D 85/00 | (2006.01) |
| B65D 25/28 | (2006.01) |
| A47C 7/02 | (2006.01) |
| A47C 7/62 | (2006.01) |
| A47C 7/00 | (2006.01) |
| B65B 5/06 | (2006.01) |

(52) U.S. Cl.
CPC .......... *B65D 43/0212* (2013.01); *A47C 7/002* (2013.01); *A47C 7/02* (2013.01); *A47C 7/628* (2018.08); *B65B 5/06* (2013.01); *B65D 25/28* (2013.01); *B65D 85/70* (2013.01)

(58) Field of Classification Search
CPC .... B65D 43/0212; B65D 25/28; B65D 85/70; B65D 25/20; A47C 7/628; A47C 7/002; A47C 7/02; A47C 9/10; A47C 7/62; A47C 13/00; A47C 4/54; A47C 7/0213; B65B 5/06; A45C 2009/002

USPC ........................................................ 53/471
See application file for complete search history.

(56) References Cited

U.S. PATENT DOCUMENTS

| | | | | |
|---|---|---|---|---|
| 100,801 | A * | 3/1870 | Pratt | B63C 9/30 |
| | | | | 441/126 |
| 1,830,570 | A * | 11/1931 | Smith | A47C 7/021 |
| | | | | 267/117 |
| 2,603,028 | A * | 7/1952 | Roberts | A01K 97/20 |
| | | | | 297/188.09 |
| 2,919,169 | A * | 12/1959 | Jackson | A47J 47/02 |
| | | | | 297/188.09 |
| 3,114,574 | A * | 12/1963 | Pryale | A47C 7/62 |
| | | | | 297/188.1 |
| 3,135,978 | A * | 6/1964 | Grasmoen | A47C 27/081 |
| | | | | 441/131 |
| 3,751,845 | A * | 8/1973 | van Leeuwen | A01K 97/05 |
| | | | | D22/136 |

(Continued)

*Primary Examiner* — Dariush Seif
(74) *Attorney, Agent, or Firm* — Charmassan, Buchaca & Leach, LLP

(57) ABSTRACT

A toting apparatus can include a bucket, a combination lid and seat cushion, and a harness for carrying the apparatus while the lid covers the top opening of the bucket and the cushion is in the inflated or deflated configuration. The cushion can be formed by a drop-stitch type bladder inflatable using a common hand-operated bicycle pump. The harness can include a belt that wraps around the bucket and a pair or diametrically spaced-apart straps that adjustably and snuggly attach to a central handle structure atop the lid. Various corresponding patches of hook-and-vane style fabric fasteners allow for releasable affixation of various components of the apparatus. Thus the harness can be made of durable flexible fabric.

12 Claims, 10 Drawing Sheets

(56) References Cited

U.S. PATENT DOCUMENTS

| | | | | |
|---|---|---|---|---|
| 4,067,607 A | * | 1/1978 | Battles | A01K 97/22 D3/905 |
| 4,295,680 A | * | 10/1981 | Grasso | A45C 11/20 297/188.09 |
| 4,379,587 A | * | 4/1983 | Duncan | A01K 97/05 297/130 |
| 4,390,113 A | * | 6/1983 | Bird | B65D 43/0212 220/366.1 |
| 5,429,265 A | * | 7/1995 | Maire | B25H 3/00 206/372 |
| D371,185 S | * | 6/1996 | Mullins | D22/136 |
| 5,586,805 A | * | 12/1996 | Rinehart | A01K 97/22 297/188.1 |
| 5,755,057 A | * | 5/1998 | Dancer | B25H 3/026 206/315.11 |
| D397,755 S | * | 9/1998 | Peterson | D21/803 |
| D408,509 S | * | 4/1999 | Goble | D23/311 |
| 5,970,651 A | * | 10/1999 | Torkilsen | B63C 9/28 297/188.09 |
| D446,617 S | * | 8/2001 | Urbanski | D32/53 |
| 7,055,907 B1 | * | 6/2006 | Tilby | A01M 31/02 297/382 |
| 7,832,663 B1 | * | 11/2010 | Cotham | A01C 15/02 239/152 |
| D639,612 S | * | 6/2011 | Huang | D7/608 |
| 8,251,269 B2 | * | 8/2012 | Winneur | A45C 9/00 224/652 |
| D671,372 S | * | 11/2012 | Zou | D7/608 |
| D677,895 S | * | 3/2013 | Camp, III | D3/318 |
| 9,072,382 B2 | * | 7/2015 | Johansson | A47C 4/021 |
| 9,078,526 B1 | * | 7/2015 | Kammeyer | A47C 4/021 |
| 9,567,135 B1 | * | 2/2017 | Spadaccini | A63B 60/60 |
| 10,597,191 B2 | * | 3/2020 | Seiders | B65D 25/32 |
| 11,103,073 B1 | * | 8/2021 | Hertlein | B65D 51/24 |
| D956,446 S | * | 7/2022 | Boles | D6/601 |
| 2016/0242551 A1 | * | 8/2016 | Anastos | A47C 7/021 |
| 2018/0015649 A1 | * | 1/2018 | Hutchinson | B29C 33/02 |
| 2018/0244432 A1 | * | 8/2018 | Seiders | B65D 11/22 |
| 2021/0394972 A1 | * | 12/2021 | Friedman | A47C 7/0213 |

* cited by examiner

INFLATABLE BUCKET LID SEAT AND HARNESS

FIELD OF THE INVENTION

This invention relates to portable, multi-use toting and seating devices and more particularly to utility buckets that can be used as a seat.

BACKGROUND

Buckets and other toting devices have long been used to transport recreational items such as sports balls and other sporting equipment to locations such as parks or playing fields. Since access to such locations is often limited to walking persons, items must be carried to the playing field. Therefore, hand carried buckets are often used to transport numerous smaller items. Similarly, such buckets are often used to transport boating and fishing supplies to and from personal marine vessels such as sailboats and powerboats.

Most buckets include a handle that pivotingly engages diametrically opposite points on the sidewall of a cylindrical bucket near its upper opening. The handle extends over the upper opening of the bucket during carrying but swings out of the way to one or the other side when the contents of the bucket are being accessed.

Because of the limited number of items a person can typically carry, those items which perform multiple purposes are often preferred. Consequently, buckets are often emptied, turned upside down and used as a seat.

U.S. Pat. No. 4,295,680 to Grasso, incorporated herein by reference, describes a bucket having a lid which doubles as a seat cushion. One primary drawback of prior buckets having lids which operate at a seat cushion is that the seat cushion interferes with the free movement of the bucket handle while the cushion is mounted over the bucket opening. Thus the cushion must often be removed during use of the bucket handle for carrying. This creates an additional item that must be carried to and from the destination. Furthermore, the cushions are often bulky taking up significant space when carried or stowed.

In the context of marine equipment, the harsh environment of repeated exposure to sun and salt water can rapidly deteriorate fabric cushion material. Furthermore, such cushions often require cleaning and drying after use which is often time consuming.

Therefore, there is a need for an apparatus which addresses one or more of the above identified inadequacies.

SUMMARY

The principal and secondary objects of the invention are to provide an improved cushioned toting bucket. These and other objects can be achieved by an adjustable harness engaging over a cushioned lid on a toting bucket.

In some embodiments there is provided a toting bucket using a drop-stitch cushioned lid.

In some embodiments there is provided a drop stitch type inflatable bucket seat lid.

In some embodiments there is provided a bucket lid which comprises: a cushion comprising: an inflatable bladder comprising: a top panel; a bottom panel; a semi-toroidal wall peripherally connecting said top and bottom panels to one another; a plurality of spaced apart pillars each of which connects said top panel to said bottom panel; and, a valve penetrating said bladder.

In some embodiments there is provided an improved toting apparatus which comprises: a bucket; a lid; a harness; wherein said bucket comprises: a sidewall extending upwardly from a closed bottom, sais sidewall terminating in a substantially circular upper rim surrounding an open top; wherein said lid is shaped and dimensioned to close said open top; wherein said lid comprises: a cushion comprising: an inflatable bladder comprising: a top panel; a bottom panel; a wall peripherally connecting said top and bottom panels to one another; a plurality of spaced apart pillars each of which connects said top panel to said bottom panel; a valve penetrating said bladder; wherein said harness comprises: a belt circumnavigating said sidewall; a first strap connected to and extending substantially orthogonally from a first medial location on said belt; a second strap connected to and extending substantially orthogonally from a second medial location on said belt; wherein said first and second medial locations are spaced apart a spacing commensurate with one half a circumference of said sidewall; a leash connecting said first strap to said second strap; a handle connected to said leash.

In some embodiments said top panel is substantially circular; said bottom panel is substantially circular; and said wall is substantially semi-toroidal.

In some embodiments said bottom panel comprises a peripheral ledge shaped and dimensioned to seal said lid against said rim.

In some embodiments said first strap is length adjustable.

In some embodiments said second strap is length adjustable.

In some embodiments the toting apparatus further comprises: said first strap being adjustable between a first shorter state and a second longer state; wherein while said first strap is in said shorter state said strap is incapable of stretching over an edge of said lid while said lid is inflated and spans said opening.

In some embodiments said cushion has a first cross-section corresponding to an uninflated state and a second cross-section corresponding to an inflated state; wherein said first cross-section is smaller than said second cross-section.

In some embodiments the toting apparatus further comprises: a first bucket patch of fabric fastener of a first type formed on an outer surface of said sidewall at a first location; a second bucket patch of fabric fastener of a first type formed on an outer surface of said sidewall at a second location; wherein said first and second locations are diametrically opposite one another.

In some embodiments the toting apparatus further comprises: said bucket comprising a first patch of fabric fastener on an outer surface of said sidewall; wherein said belt comprises a second patch of fabric fastener releasably bonded to said first patch of fabric fastener.

In some embodiments the toting apparatus further comprises: said bucket further comprising a peripheral ridge extending downwardly from said base; said cushion further comprising an engagement shaped and dimensioned to engage said open top; wherein said engagement comprises: a bottom surface having a groove shaped and dimensioned to nest said peripheral ridge.

In some embodiments said bottom surface further comprises a first patch of fabric fastener, and wherein said base has an outer surface having a second patch of fabric fastener oriented to adhere to said first patch of fabric fastener when said bottom surface and said outer surface are brought together.

In some embodiments said cushion has a first cross-section corresponding to an uninflated state and a second cross-section corresponding to an inflated state; wherein said first cross-section is smaller than said second cross-section.

In some embodiments there is provided a toting apparatus comprises: a harness which comprises: a belt having a length; a first strap connected to and extending substantially orthogonally from a first medial location on said belt; a second strap connected to and extending substantially orthogonally from a second medial location on said belt; wherein said first and second medial locations are spaced apart a spacing less than one half the length of said belt; and, a handle adjustably connected to said straps.

In some embodiments each of said straps adjustably attach to said handle.

In some embodiments said first strap is length adjustable.

In some embodiments said second strap is length adjustable.

In some embodiments the toting apparatus further comprises: said first strap being adjustable between a first shorter state and a second longer state; wherein while said first strap is in said shorter state said strap is incapable of stretching over an edge of said lid while said lid is inflated and spans said opening.

In some embodiments there is provided a method for toting items comprises: inserting a set of contents into a bucket having a top opening; sealing said top opening with a cushioned lid; securing a harness to said bucket; wherein said securing comprises: wrapping a belt circumferentially around a sidewall of said bucket below said top opening; extending diametrically opposed straps from said belt over said cushioned lid; and, attaching said straps to a handle atop said cushioned lid; wherein said attaching comprises adjusting said straps to snuggly engage said cushioned lid; and, lifting collectively said bucket, said set of contents, said cushioned lid and said harness by said handle.

The original text of the original claims is incorporated herein by reference as describing features in some embodiments.

DESCRIPTION OF THE EXEMPLARY EMBODIMENTS

Figure 1:
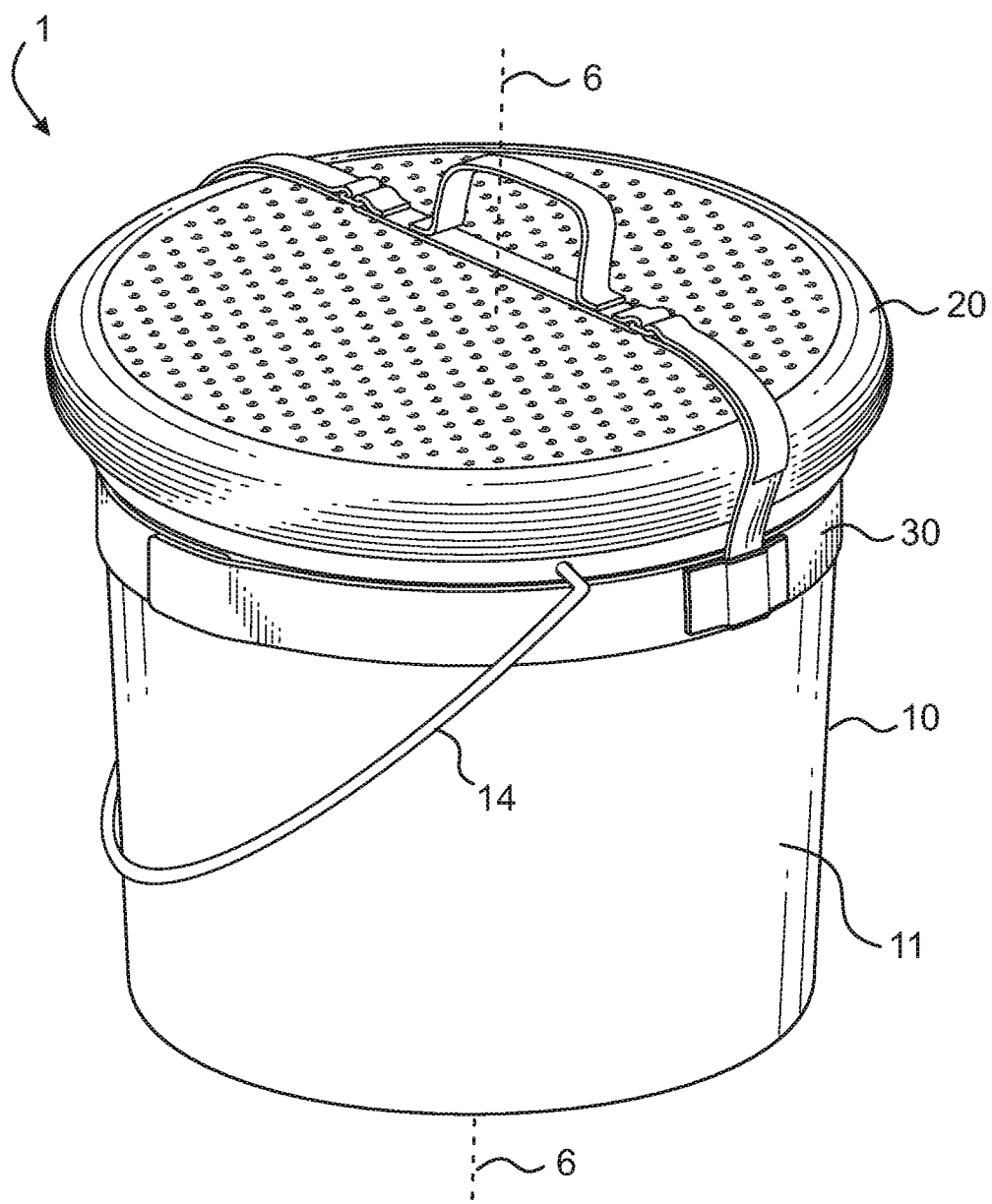
FIG. 1 is a diagrammatic perspective view of a toting apparatus including a bucket, a combination lid and seat cushion, and a harness in an assembled configuration according to an exemplary embodiment of the invention.

In this specification, the references to top, bottom, upward, downward, upper, lower, vertical, horizontal, sideways, lateral, back, front, etc. can be used to provide a clear frame of reference for the various structures with respect to other structures while the bucket is resting with its closed bottom on the ground as shown in FIG. 1, and not treated as absolutes when the frame of reference is changed, such as when the bucket is inverted or resting on its side.

The term "substantially" can be used in this specification because manufacturing imprecision and inaccuracies can lead to non-symmetricity and other inexactitudes in the shape, dimensioning and orientation of various structures. Further, use of "substantially" in connection with certain geometrical shapes, such as "cylindrical" and "conical", letter shapes, such as "U-shaped" and orientations, such as "parallel" and "perpendicular", can be given as a guide to generally describe the function of various structures, and to allow for slight departures from exact mathematical geometrical shapes, letter shapes, and orientations, while providing adequately similar function. Those skilled in the art will readily appreciate the degree to which a departure can be made from the mathematically exact geometrical references.

If used in this specification, the word "axial" is meant to refer to directions, movement, or forces acting substantially parallel with or along a respective axis, and not to refer to rotational nor radial nor angular directions, movement or forces, nor torsional forces unless otherwise noted.

In this specification the units "millimeter" or "millimeters" can be abbreviated "mm".

In this specification reference is made to the use of numerous patches of hook-and-vane fabric fastener such as VELCRO brand fastener available from Velcro USA Inc. of Manchester, N.H. in which a patch of hook-and-vane fabric fastener of a first type (either hook or vane) can releasably fasten to a patch of the opposite type. For example a patch of the hook type would releasably bond to a patch of the vane type. For clarity such fasteners are referred to in this specification as fabric fasteners, and a patch of fabric fastener will bond to a corresponding patch of fastener. Those skilled in the art will readily appreciate which type will best be used for any given patch and whether the type of matable patches can be swapped.

Figure 2:
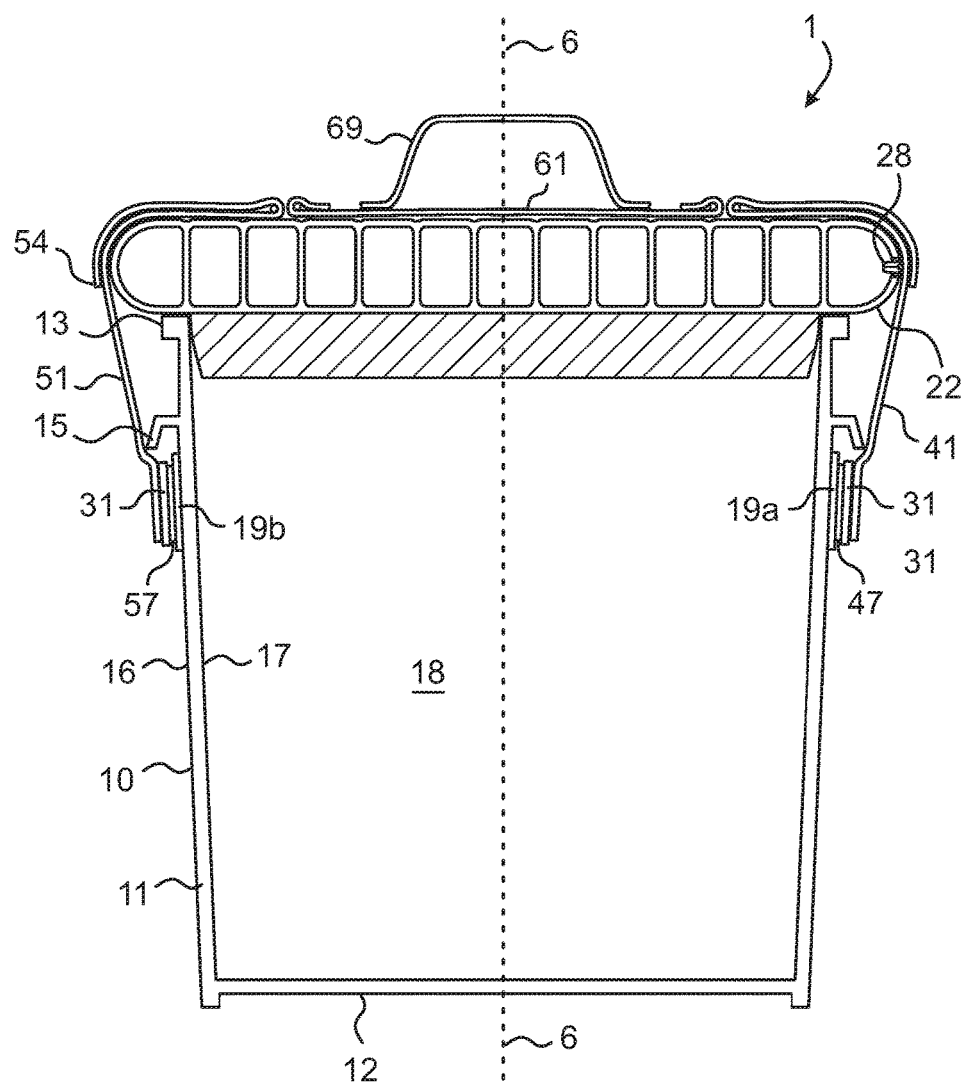
FIG. 2 is a diagrammatic cross-sectional side view of the assembled bucket, lid, and toting harness.
Figure 3:
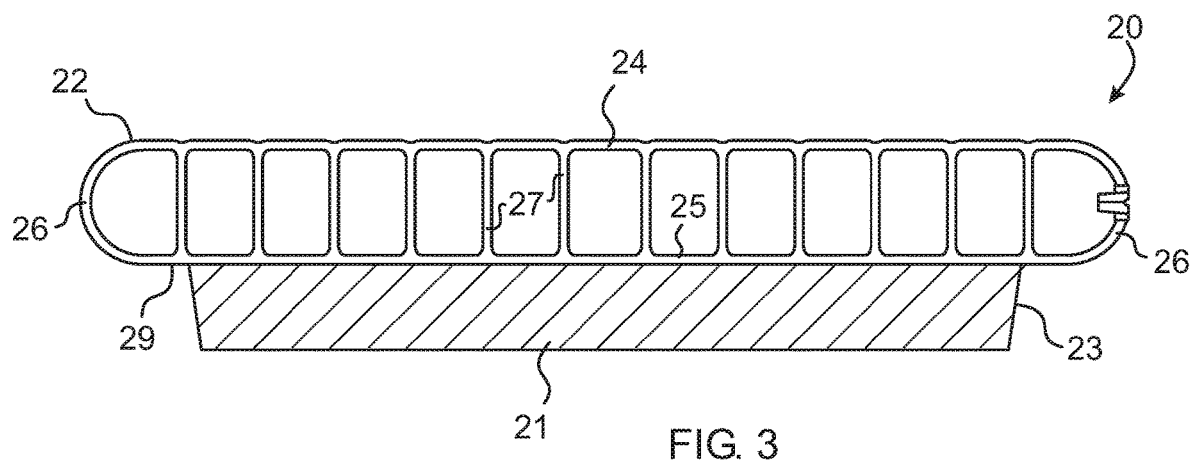
FIG. 3 is a diagrammatic cross-sectional side view of the lid.

Referring now to the drawing, there is shown in FIGS. 1-3 a system 1 for portably containing and transporting smaller items according to an exemplary embodiment of the invention. The system can include a bucket 10, a lid 20 for sealing the top opening of the bucket, and a carrying harness 30. The bucket 10 can be of the 5 Gallon Plastic Bucket type commercially available from West Marine company of Watsonville, Calif. The bucket can have a substantially cylindrical shape having a central axis 6 including a substantially cylindrical and typically slightly conical sidewall 11 extending upwardly and radially outwardly from a substantially circular closed bottom base 12 and terminating in a substantially circular upper rim 13 surrounding a top opening. The sidewall can have and outer surface 16 and an inner surface 17 surrounding an internal compartment 18. A medial stiffening ridge 15 can extend circumferentially around the outer surface of the sidewall axially spaced apart from the top opening. A curved handle 14 can pivotingly connect to the ridge at diametrically opposite points allowing the handle to swing over the top opening to carry the bucket when the lid is deflated or not present, and swing to the side against the outer surface of the sidewall when the bucket is not being carried.

The removable lid 20 can be shaped and dimensioned to intimately engage, and seal against the top rim 13 of the bucket 10. The lid can include an inflatable top cushion 22 that can be of the drop-stitch type that forms an inflatable, airtight bladder formed by a substantially circular top panel 24, a substantially circular bottom panel 25 connected by a semi-toroidal peripheral wall 26. The top and bottom panels can be internally interconnected by an array of substantially vertical, evenly spaced apart pillars 27 which allow the top surface to remain substantially planar while the bladder is inflated to a maximum pressure while using a minimum of material for reinforcement. The cushion can have a rubberized pinch valve 28 located on the peripheral wall to allow for inflation using a needled bicycle-style air pump. The cushion can be made from a durable, flexible airtight material such as nylon reinforce polyvinyl material.

The lid 20 can include a bottom circular engagement 21 shaped and dimensioned to insert and extend axially a distance into the top opening of the bucket and bear against the inner surface of the bucket sidewall thereby positioning the lid in axial alignment with the bucket. The engagement can be made of a semi-rigid, insulating material such as rubberized plastic in order to form a water-tight seal with the bucket. The engagement can have a substantially conical sidewall 23 to facilitate insertion into the top opening of the bucket.

A portion of the cushion 22 can form a peripheral ledge 29 surrounding the engagement 21 which bears against the top rim 13 of the bucket 10 to support the lid 20 and bear the weight of an axial load placed upon the lid such as by a seated person. Since the inflatable cushion has a resiliency, the ledge can seal against the rim in absence of an additional gasket or other seal enhancing structure, thereby simplifying manufacturing.

Figure 4:
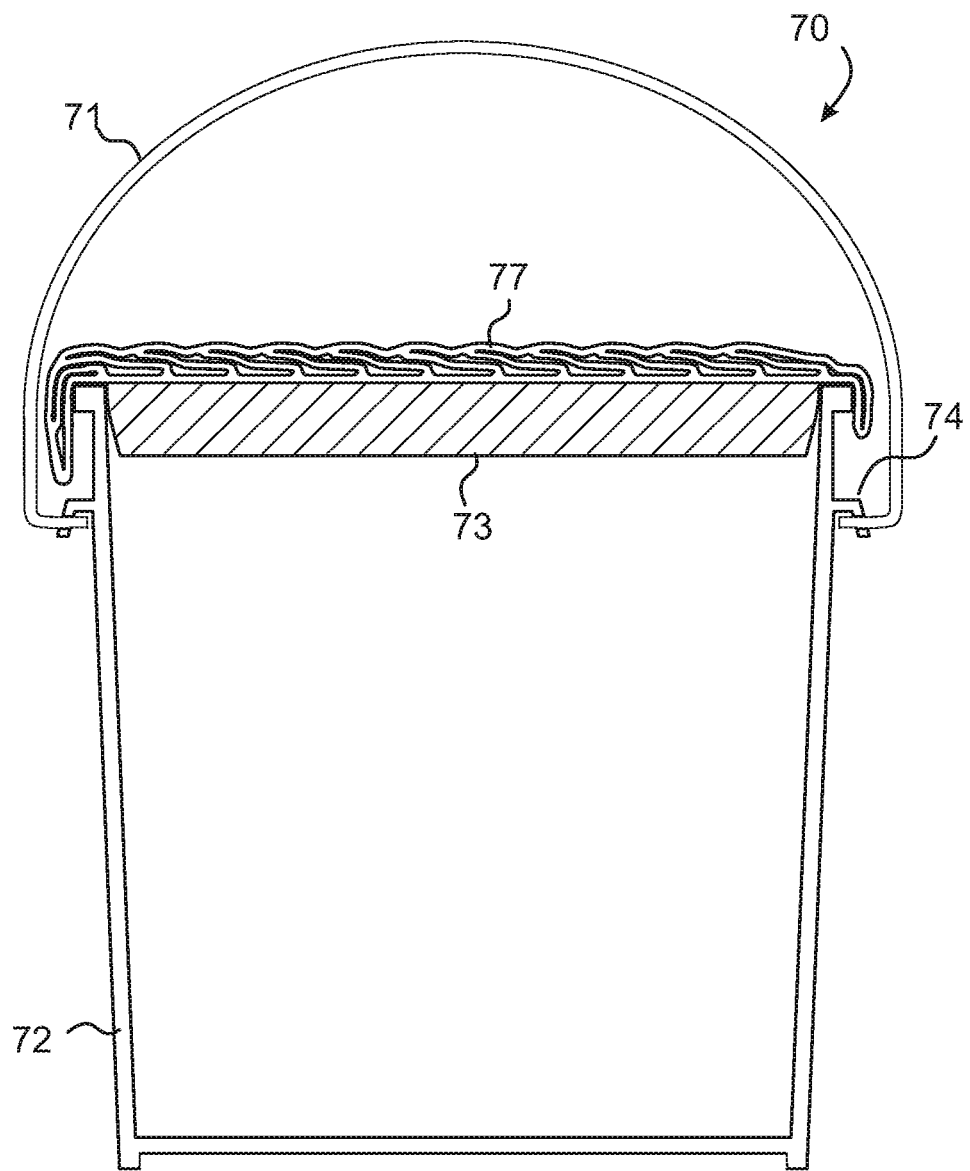
FIG. 4 is a diagrammatic perspective view of the bucket and lid in the deflated configuration.

As shown in FIG. 4 the apparatus 70 where the deflated cushion 77 allows the stock handle 71 of the bucket 72 to swing over the entire lid 73 even while it remains emplaced sealing the top opening of the bucket. In this way the cushion can have a cross-section corresponding to an deflated state and a second cross-section corresponding to an inflated state where the first cross-section is smaller than the second cross-section. The first cross-section can be small enough to allow clearance for the swinging handle that pivotably engages the circumferential ridge 74 to pass entirely over the top of the bucket from one side to the other.

Figure 5:
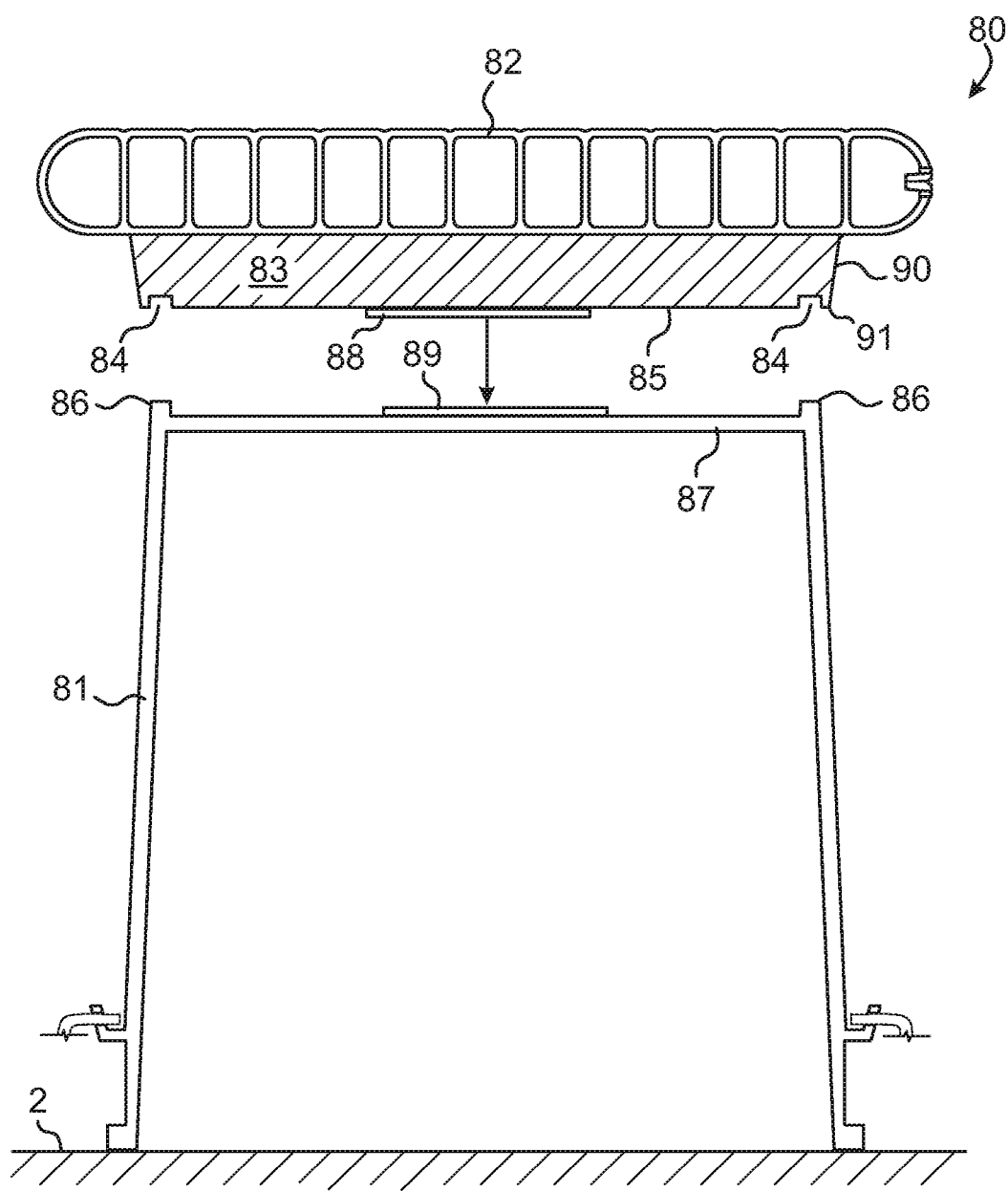
FIG. 5 is a diagrammatic cross-sectional side view of a cushioned lid being secured to the upturned bottom of an inverted bucket.

As shown in FIG. 5, an alternate embodiment of the apparatus 80 includes a bucket 81 in an inverted orientation and a lid 82 similar to the embodiment of FIGS. 1-4, however, the lid can include an engagement 83 having a substantially circular groove 84 set axially into the exposed bottom surface 85 of the engagement. The groove can be shaped and dimensioned to loosely nest the substantially circular peripheral bottom ridge 86 that typically extends axially from the outer surface of the base 87 of the bucket. This allows a patch of fabric fastener 88 secured to the bottom surface of the engagement to contact and releasably bond to a corresponding patch of fabric fastener 89 secured to the exposed outer surface of the base. The patches can be located in central regions of the outer surface and outer surface so that the patches are in substantial axial alignment regardless of the relative angular positioning of the bucket and lid. The engaged fabric fasteners releasably can secure the lid to the base of the bucket. In this way the bucket can be turned upside down and placed on the ground 2 and used as a seat. The presence of the groove can further reduce the stiffness of the conical sidewall 90 at least near its distal peripheral rim 91 thereby enhancing the resiliency of the sidewall and potentially enhancing the seal between the lid and bucket opening on some buckets.

Figure 6:
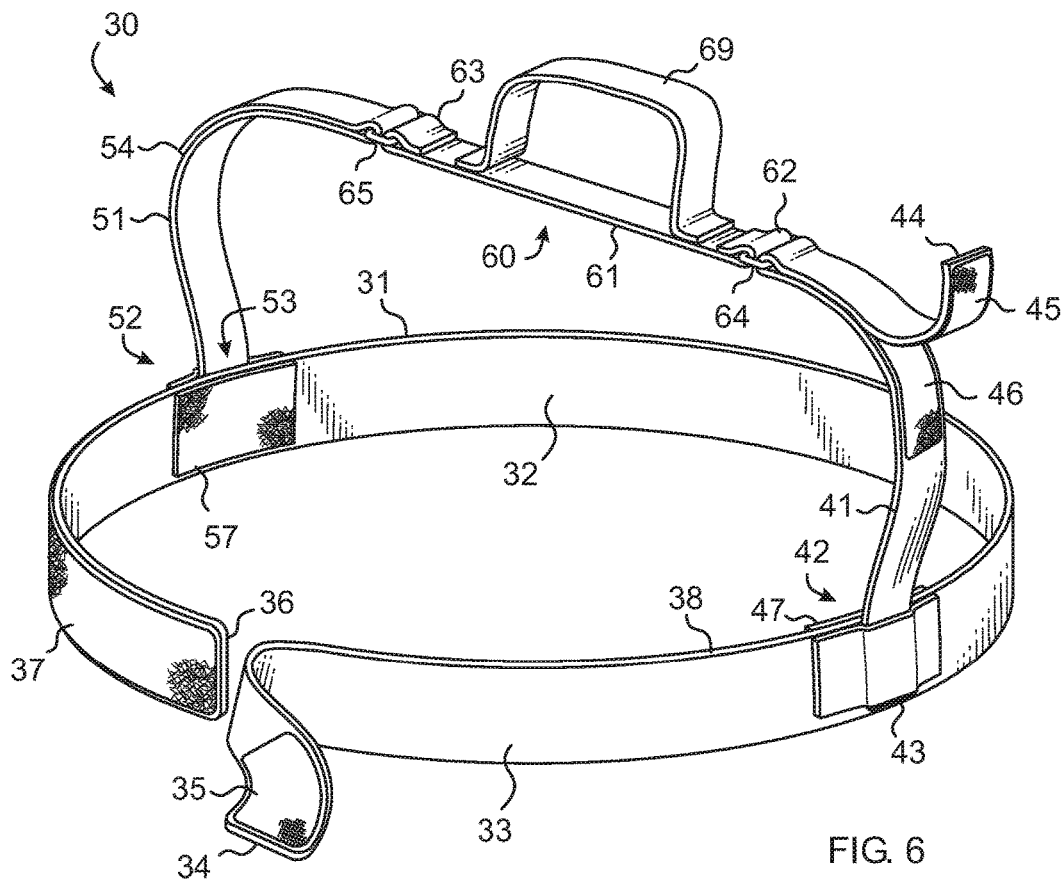
FIG. 6 is a diagrammatic perspective view of the harness.
Figure 7:
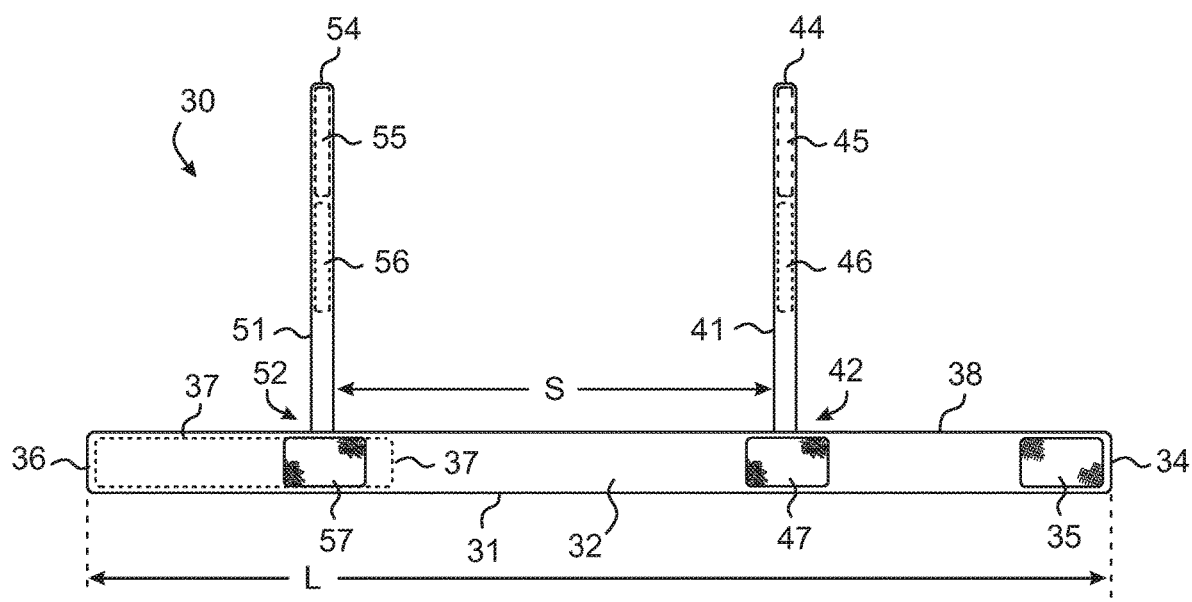
FIG. 7 is a diagrammatic view of the belt and strap portion of the harness laid flat.

Referring now primarily to FIGS. 6-7, the adjustable harness 30 can secure to the bucket 10 to allow the bucket to be carried while the inflated lid 20 covers the top opening. The harness can releasably secure to the bucket below the stiffening ridge 15 and adjust to firmly hold the lid in place on top of the bucket. The harness can include a circumferential belt 31 made from a substantially linear, oblong strip of durable, pliable material such as woven nylon infused fabric having an inner surface 32 and an outer surface 33. The belt can have a first end 34 including a patch 35 of fabric fastener formed on the inner surface, and a second opposite end 36 including a corresponding patch 37 of fabric fastener. The patches can overlap so that the circumference of the belt can be adjusted to closely match the circumference of the bucket just below the ridge.

The harness 30 can include a pair of straps 41, 51 that are sewn to the belt 31 at spaced apart medial locations 42, 52 on the belt that are separated by a spacing S corresponding to one have the circumference of the bucket 10 just below the ridge 15. In this way the straps can diametrically straddle the top opening of the bucket. It shall be noted that the spacing could naturally therefore be less than one half the length L of the belt.

Each strap 41, 51 can connect to the belt 31 at a first fixed end 43, 53 and have a free end 44, 54 extending upwardly and substantially orthogonally from a common, upper edge 38 of the belt. Each strap includes a distal patch of fabric fastener 45, 55 formed on the outer surface near the free end that can releasably bond to a corresponding medial patch 46, 56 formed on the outer surface at a medial position when each strap is folded outwardly back upon itself.

The harness 30 can include an upper tie-piece 60 to which the straps releasably and adjustably attach. The tie-piece can include a lateral leash 61 having a pair of looped opposite ends 62, 63 each carrying a rounded quadrangular buckle 64, 65. Each buckle can be engaged by the free end of one of the straps 41, 51. For example, the free end 44 of strap 41 can pass through the buckle 64 and loop back on itself to bond to its distal fabric fastener patch 45 to its medial patch 46. The other strap 51 can similarly engage and secure to the other buckle 65. A handle 69 secured to a medial section of the leash 61 can extend upwardly for convenient grasping by a user.

In this way the length of each strap 41, 51 between the belt 31 and its respective buckle 64, 65 can be adjusted in order to center the upper tie-piece 60 toward the central axis 6 of the bucket and cause the straps to tightly bear against the lid 20 regardless of whether the cushion portion is inflated or not.

In this way one strap can be loosened to allow removal of the lid from the bucket without disconnecting the belt from the bucket. Therefore, ether strap can be adjustable between a first shorter state and a second longer state. In the shorter state the strap is incapable of stretching over an edge of the lid while the lid is inflated and in place covering the opening.

A pair of fabric fastener patches 47, 57 can be formed on the inner surface 32 of the belt 31 at the spaced apart medial locations 42, 52. The patches are thus located and oriented to contact corresponding bucket patches 19a, 19b secured to diametrically opposite areas of the outer surface of the sidewall of the bucket, just below the ridge. The bucket patches firmly attach the belt to the bucket at locations on the belt where the straps connect to the belt. In this way forces applied by the straps that would tend pull the belt away from the bucket are accommodated. Further, optional swatches 49, 59 of durable flexible sheet material such as woven nylon infused fabric can be sewn over the fixed ends 43, 53 of the straps 41, 51, thus sandwiching the fixed ends between the belt and the swatches. The swatches serve to stiffen that region of the belt most susceptible to buckling due to the force of the straps thereon.

The straps 41, 51, the lateral leash 61, and the handle 69 can all be made from a durable, pliable fabric material such as woven nylon infused fabric. Thus the harness can assume a compact state for ready storage. In this way the entire harness can be made of durable flexible fabric in absence of any rigid component.

Figure 8:
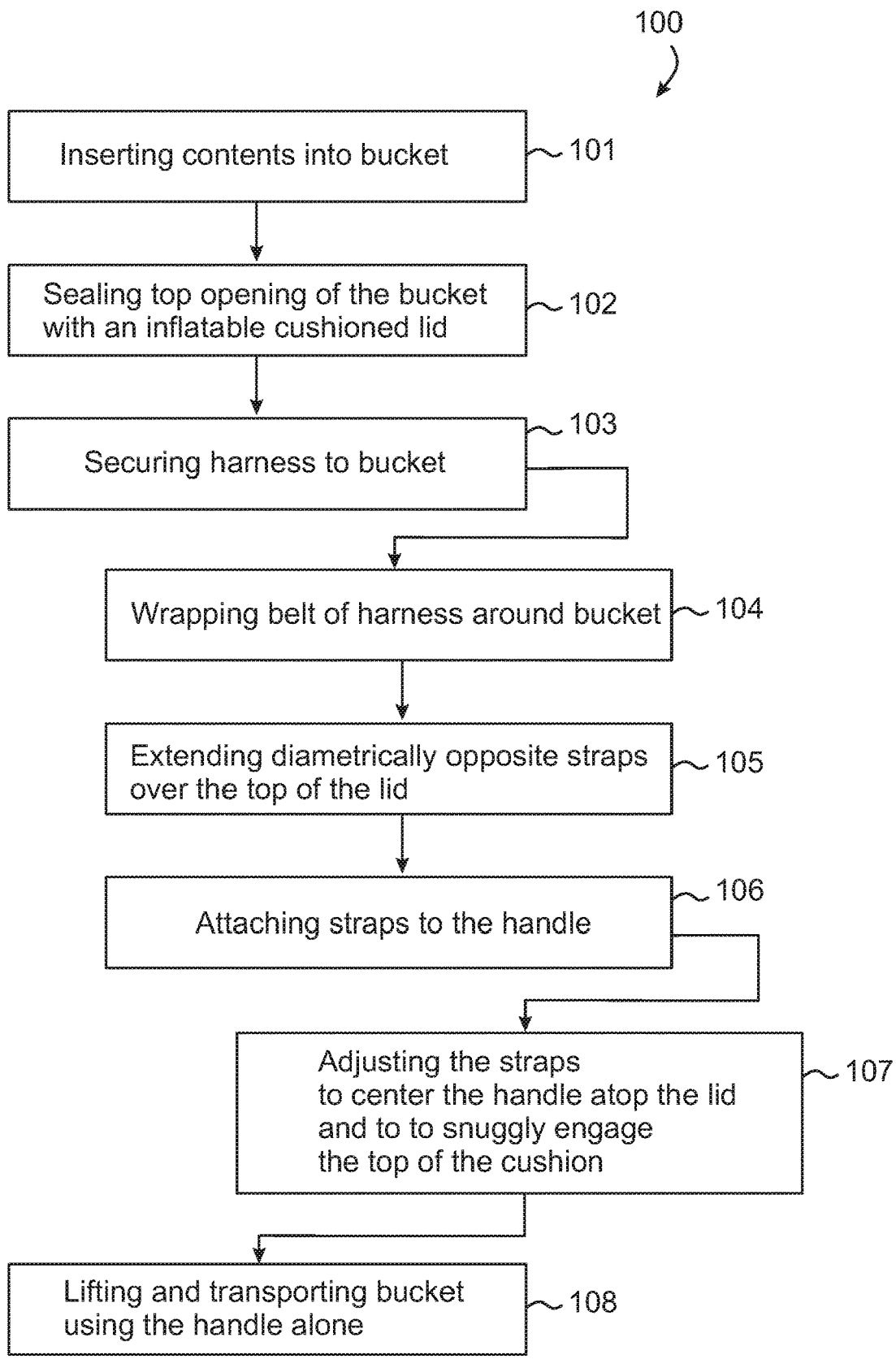
FIG. 8 is a flow chart diagram of a method for toting things using a bucket, cushioned lid, and harness.
Figure 9:
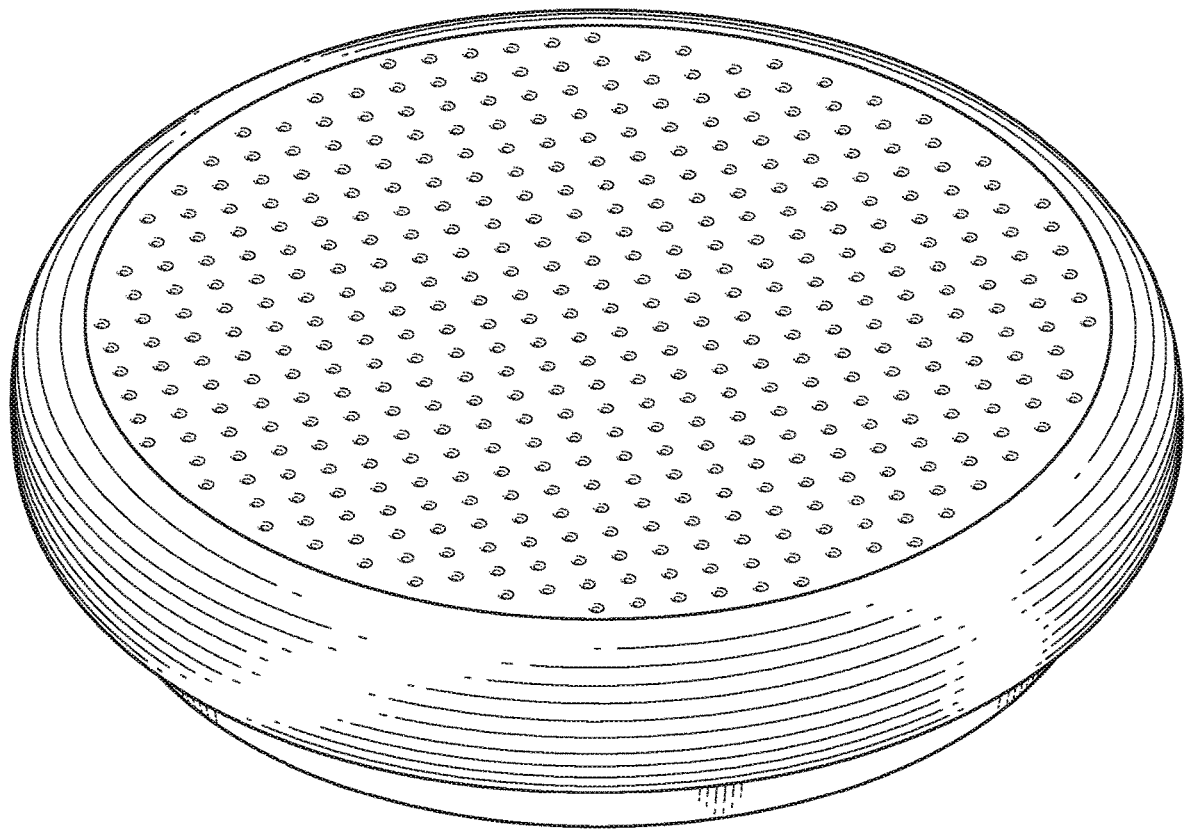
FIG. 9 shows the top, front, right side perspective view of an ornamental design of a bucket lid seat according to an alternate exemplary embodiment of the invention.
Figure 10:
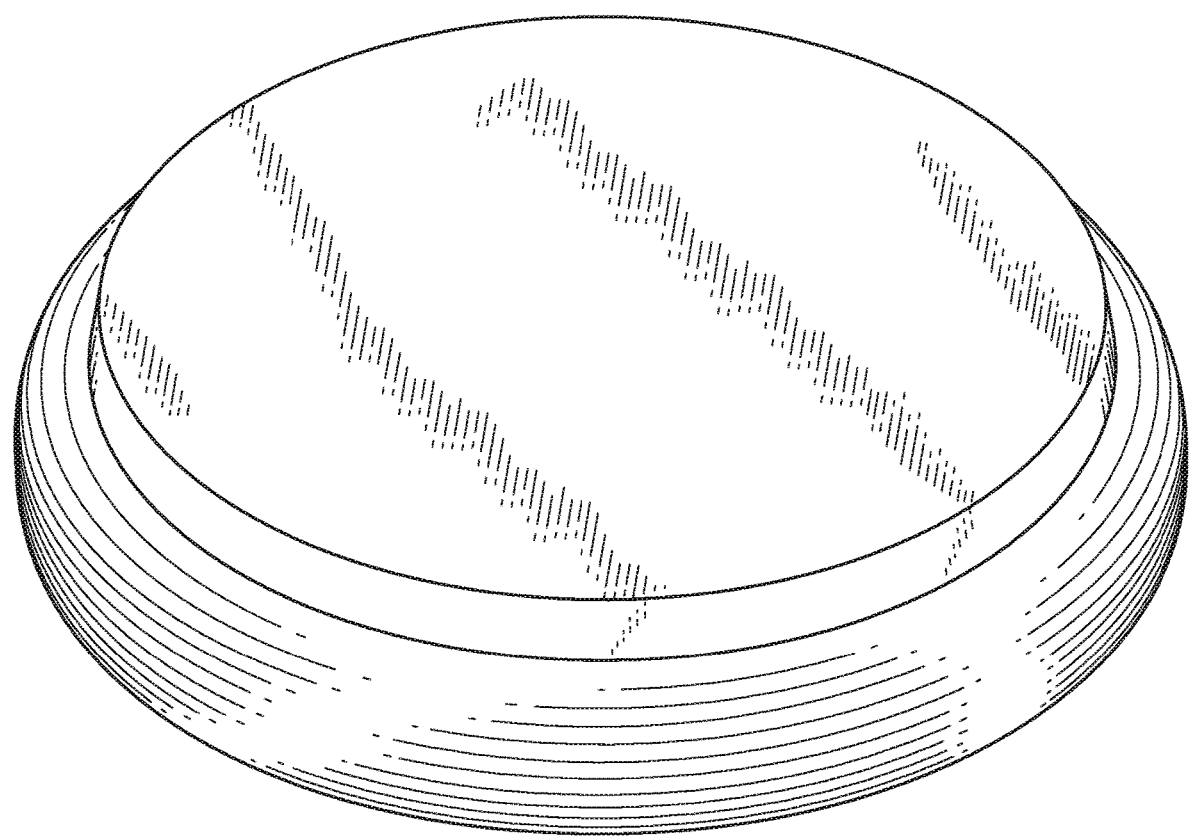
FIG. 10 shows the bottom, back, left side perspective view thereof.
Figure 11:
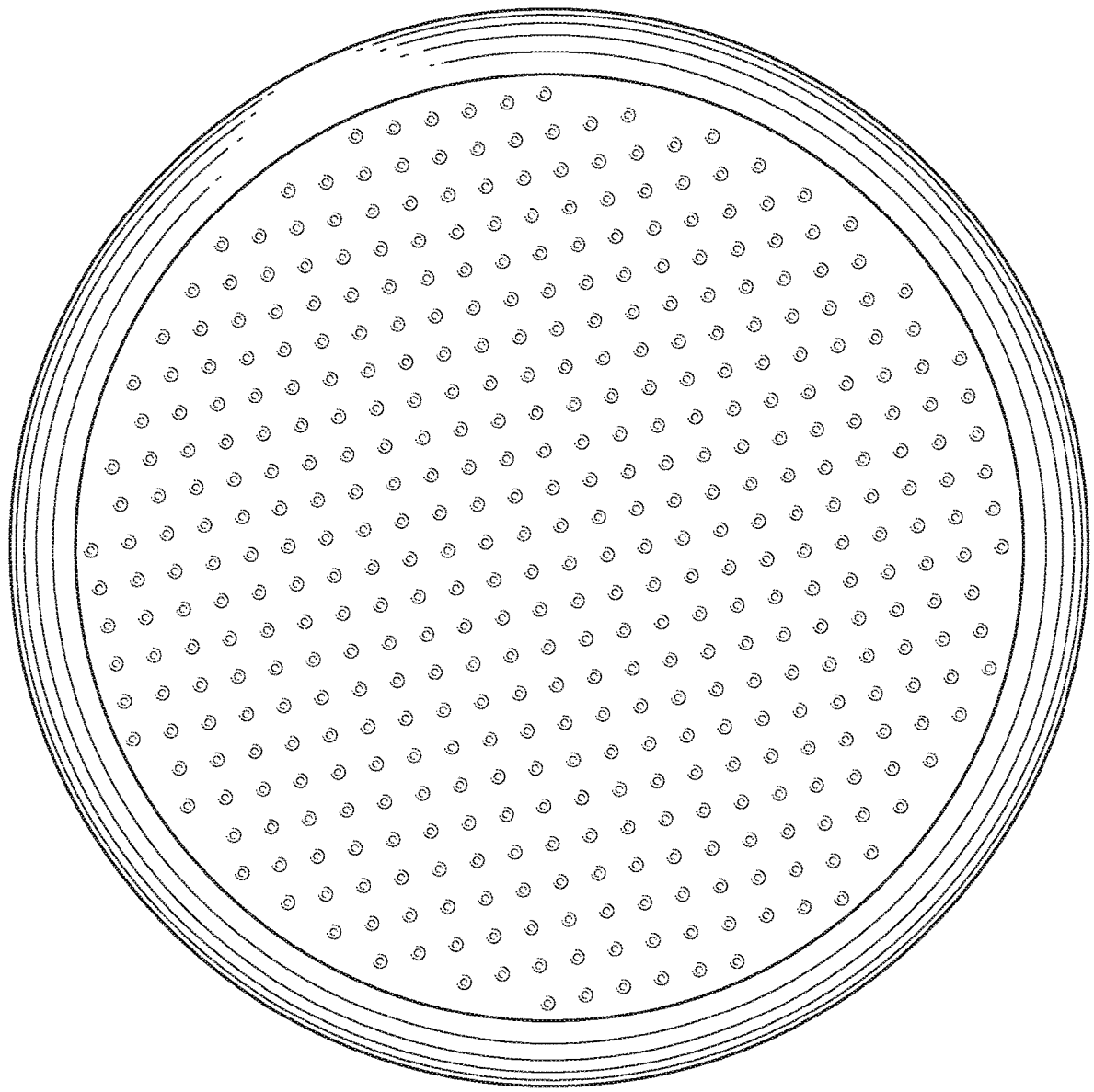
FIG. 11 shows the top plan view thereof.
Figure 12:
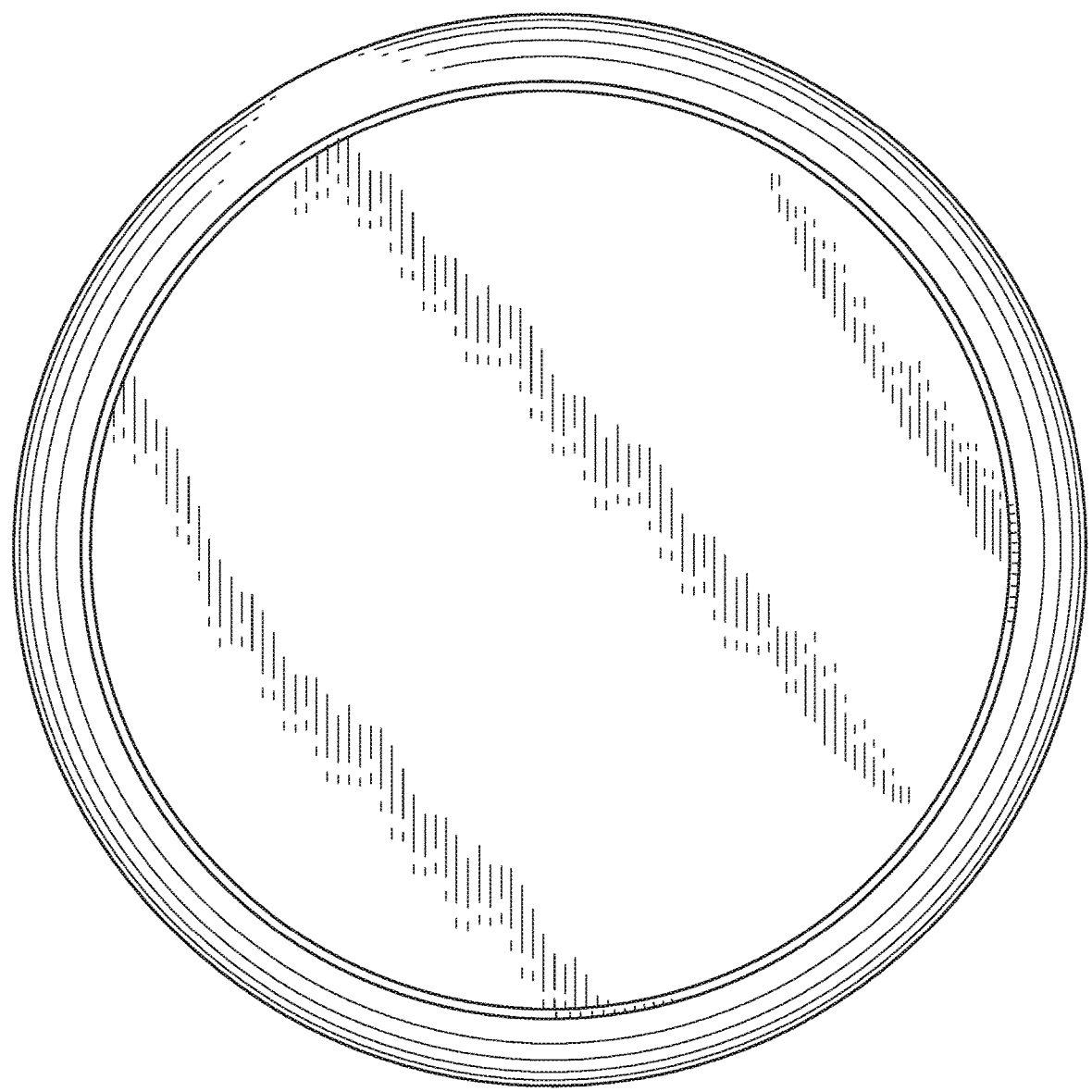
FIG. 12 shows the bottom plan view thereof.
Figure 13:
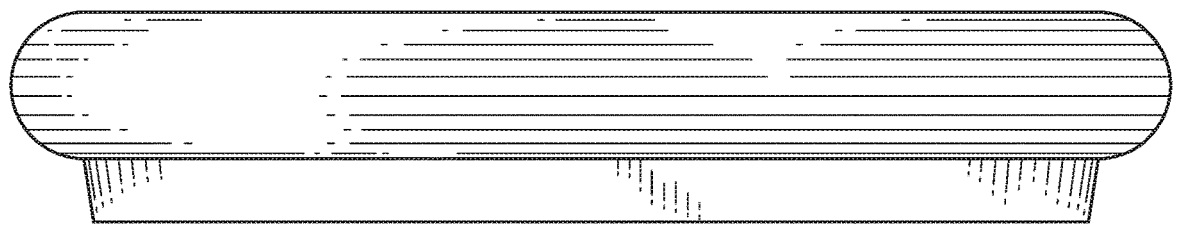
FIG. 13 shows the right side elevation view thereof, the left side, front, and back elevation views being identical images thereof.

Referring now to FIG. 8, there is shown a method 100 for toting items in a bucket. The method includes inserting a set of contents 101 such as sports equipment, boating equipment or liquid for example into a bucket having a top opening, then sealing the top opening 102 using an inflatable cushioned lid. A harness can then be secured 103 to the bucket by: wrapping a belt 104 circumferentially around a sidewall of the bucket below said top opening; extending straps 105 connected to the belt at diametrically opposite positions over the top of the cushioned lid; and, attaching the straps to a handle 106 that can be located directly atop the cushioned lid, in other words intersected by the vertical axis of the bucket. The attachment of the straps to the handle can be adjusted 107 so that the handle and straps can contact the top of the cushioned lid and snuggly keep it in place on the bucket regardless of whether the cushion is inflated or not. After the harness is secured to the bucket, the entirety of the bucket, its contents, the lid, and the harness can be lifted 108 collectively and transported to a destination using only the handle as a grasping point for the user.

FIGS. 9-13 show the appearance of a combination drop-stitch inflatable seat cushion and bucket lid in support of a claim for an original ornamental design.

While the preferred embodiments of the invention have been described, modifications can be made and other embodiments may be devised without departing from the spirit of the invention and the scope of the appended claims.

What is claimed is:

1. An improved toting apparatus comprises:
a bucket;
a lid;
a harness;
wherein said bucket comprises:
  a sidewall extending upwardly from a closed bottom, sais sidewall terminating in a substantially circular upper rim surrounding an open top;
wherein said lid is shaped and dimensioned to close said open top;
wherein said lid comprises:
  a cushion comprising:
    an inflatable bladder comprising:
      a top panel;
      a bottom panel;
      a wall peripherally connecting said top and bottom panels to one another;
      a plurality of spaced apart pillars each of which connects said top panel to said bottom panel;
    a valve penetrating said bladder;
wherein said harness comprises:
  a belt circumnavigating said sidewall;
  a first strap connected to and extending substantially orthogonally from a first medial location on said belt;
  a second strap connected to and extending substantially orthogonally from a second medial location on said belt;
  wherein said first and second medial locations are spaced apart a spacing commensurate with one half a circumference of said sidewall;
  a leash connecting said first strap to said second strap;
  a handle connected to said leash.

2. The apparatus of claim 1, wherein said top panel is substantially circular; said bottom panel is substantially circular; and said wall is substantially semi-toroidal.

3. The apparatus of claim 1, wherein said bottom panel comprises a peripheral ledge shaped and dimensioned to seal said lid against said rim.

4. The apparatus of claim 1, wherein said first strap is length adjustable.

5. The apparatus of claim 4, wherein said second strap is length adjustable.

6. The apparatus of claim 4, which further comprises:
said first strap being adjustable between a first shorter state and a second longer state;
wherein while said first strap is in said shorter state said strap is incapable of stretching over an edge of said lid while said lid is inflated and spans said opening.

7. The apparatus of claim 1, wherein said cushion has a first cross-section corresponding to an uninflated state and a second cross-section corresponding to an inflated state; wherein said first cross-section is smaller than said second cross-section.

8. The apparatus of claim 1, which further comprises:
a first bucket patch of fabric fastener of a first type formed on an outer surface of said sidewall at a first location;
a second bucket patch of fabric fastener of a first type formed on an outer surface of said sidewall at a second location;
wherein said first and second locations are diametrically opposite one another.

9. The apparatus of claim 1, which further comprises:
said bucket comprising a first patch of fabric fastener on an outer surface of said sidewall;
wherein said belt comprises a second patch of fabric fastener releasably bonded to said first patch of fabric fastener.

10. The apparatus of claim 1, which further comprises:
said bucket further comprising a peripheral ridge extending downwardly from said base;
said cushion further comprising an engagement shaped and dimensioned to engage said open top;
wherein said engagement comprises:
  a bottom surface having a groove shaped and dimensioned to nest said peripheral ridge.

11. The apparatus of claim 10, wherein said bottom surface further comprises a first patch of fabric fastener, and wherein said base has an outer surface having a second patch of fabric fastener oriented to adhere to said first patch of fabric fastener when said bottom surface and said outer surface are brought together.

12. The apparatus of claim 1, wherein said cushion has a first cross-section corresponding to an uninflated state and a second cross-section corresponding to an inflated state; wherein said first cross-section is smaller than said second cross-section.

* * * * *